United States Patent
Sharifipour et al.

(10) Patent No.: US 9,846,466 B1
(45) Date of Patent: Dec. 19, 2017

(54) SINGLE OUTPUT CHANNEL ADAPTER FOR CHARGING DURING LAPTOP SLEEP MODE

(71) Applicant: Flextronics AP, LLC, Broomfield, CO (US)

(72) Inventors: Bahman Sharifipour, Westford, MA (US); Rowell Gapuz, Quezon (PH); Wei Li, Nanshen (CN)

(73) Assignee: Flextronics AP, LLC, Broomfield, CO (US)

( * ) Notice: Subject to any disclaimer, the term of this patent is extended or adjusted under 35 U.S.C. 154(b) by 270 days.

(21) Appl. No.: 14/470,738

(22) Filed: Aug. 27, 2014

Related U.S. Application Data

(60) Provisional application No. 61/870,756, filed on Aug. 27, 2013.

(51) Int. Cl.
*G06F 1/26* (2006.01)
*G06F 1/32* (2006.01)

(52) U.S. Cl.
CPC ............ *G06F 1/266* (2013.01); *G06F 1/32* (2013.01)

(58) Field of Classification Search
None
See application file for complete search history.

(56) References Cited

U.S. PATENT DOCUMENTS

| | | | |
|---|---|---|---|
| 2002/0121882 A1 | 9/2002 | Matsuo | |
| 2005/0218942 A1 | 10/2005 | Yamashita | |
| 2007/0067659 A1* | 3/2007 | Tevanian | G06F 1/3215 713/324 |
| 2008/0270809 A1* | 10/2008 | Hoffer | G06F 1/266 713/300 |
| 2010/0115150 A1* | 5/2010 | Hachiya | G06F 1/266 710/19 |
| 2012/0042185 A1* | 2/2012 | Lee | G06F 1/266 713/323 |
| 2013/0250629 A1 | 9/2013 | Xu | |

OTHER PUBLICATIONS

Non-Final Office Action dated Jul. 12, 2016. U.S. Appl. No. 13/924,402, filed Jun. 21, 2013, 12 pages.
Non-Final Office Action dated Jul. 21, 2016. U.S. Appl. No. 13/924,388, filed Jun. 21, 2013, 16 pages.

* cited by examiner

*Primary Examiner* — Kim Huynh
*Assistant Examiner* — Joshua Neveln
(74) *Attorney, Agent, or Firm* — Haverstock & Owens LLP

(57) ABSTRACT

A method of and device for providing voltages to USB ports using an independent electrical channel during a device sleep mode or a power-off mode.

21 Claims, 4 Drawing Sheets

SINGLE OUTPUT CHANNEL ADAPTER FOR CHARGING DURING LAPTOP SLEEP MODE

CROSS-REFERENCE TO RELATED APPLICATION(S)

This application claims priority under 35 U.S.C. §119(e) of the U.S. Provisional Patent Application Ser. No. 61/870,756, filed Aug. 27, 2013 and titled, "SINGLE OUTPUT CHANNEL ADAPTER FOR CHARGING DURING LAPTOP SLEEP MODE," which is also hereby incorporated by reference in its entirety for all purposes.

FIELD OF THE INVENTION

The present invention relates to the field of battery charging. More specifically, the present invention relates to device charging using alternative circuits.

BACKGROUND OF THE INVENTION

USB ports on a laptop are used to charge various electronic devices, such as cell phone and music players. Typically, the electrical power is cut-off to the USB port when the laptop goes to a sleep mode or shut down, such that the electronic devices cannot be charged through the USB ports.

FIG. 1 illustrates a typical charging module 100 including an adaptor 102 couples with a laptop 104. The adaptor 102 can output a voltage $V_1$ in a battery 106 charging mode. During the charging mode, switch S1 108 is on "ON" or closed. A DC/DC converter 112 converts $V_1$ from 12V~20V to $V_2$ (such as 5V). $V_2$ can be used for one or more USB ports 114 through a switch S2 110. S2 110 can be controlled by a controller to protect USB port at over current, short circuit and other abnormal conditions. When the laptop 104 goes into a deep sleep mode or power off conditions (S1 108 and/or S2 110 is OFF), the USB ports 114 cannot be used.

SUMMARY OF THE INVENTION

A method of and device for providing one or more voltages to USB ports using an independent electrical channel during a device sleep mode or a power-off mode.

In an aspect, a method of maintaining power supply comprises sensing a sleep mode or a power-off mode of an electronic device and supplying electrical energy through an alternative path to an electric energy output port. In some embodiments, the electric energy output port provides an informational signal. In other embodiments, the electric energy output port comprises a USB port. In some other embodiments, the supplying electrical energy through an alternative path provides an uninterrupted power supply. In some embodiments, the method further comprises sensing an open circuit between a power source and the electric energy output port.

In another aspect, a power supply device comprises an electrical pathway allowing a transmission of electrical energy during a sleep mode of an electrical device. In some embodiments, the electrical pathway comprises a conducting wire. In other embodiments, the conducting wire is within a body of the electrical device. In some other embodiments, the conducting wire further comprises a switch. In some embodiments, the switch is in an open state when the electrical device is not in a sleep mode. In other embodiments, the switch is in a closed state when the electrical device is in a sleep mode.

In another aspect, an electronic device comprises a first electrical circuit, wherein the first electrical circuit is configured to be turned into a sleep mode in a predetermined condition and a second electrical circuit, wherein the second electric circuit is configured to supply power when the first electrical circuit is in the sleep mode. In some other embodiments, the first electrical circuit comprises a first sub-electric circuit and a second sub-electric circuit. In other embodiments, the first sub-electric circuit couples with a battery. In some other embodiments, the second sub-electric circuit couples with a USB port. In some embodiments, the second sub-electric circuit comprises a DC/DC converter. In other embodiments, the second sub-electric circuit comprises a switch. In some other embodiments, the second sub-electric circuit is configured to have a voltage less than 7V. In some embodiments, the second sub-electric circuit is configured to have a voltage close to or equal to 5V. In other embodiments, the electronic device comprises a laptop, a server, a cell phone, or a combination thereof. In some other embodiments, the predetermined condition comprises a non-use for a predetermined duration.

Other features and advantages of the present invention will become apparent after reviewing the detailed description of the embodiments set forth below.

BRIEF DESCRIPTION OF THE DRAWINGS

Embodiments will now be described by way of examples, with reference to the accompanying drawings which are meant to be exemplary and not limiting. For all figures mentioned herein, like numbered elements refer to like elements throughout.

DETAILED DESCRIPTION OF THE PREFERRED EMBODIMENT

Reference is made in detail to the embodiments of the present invention, examples of which are illustrated in the accompanying drawings. While the invention is described in conjunction with the embodiments below, it is understood that they are not intended to limit the invention to these embodiments and examples. On the contrary, the invention is intended to cover alternatives, modifications and equivalents, which can be included within the spirit and scope of the invention as defined by the appended claims. Furthermore, in the following detailed description of the present invention, numerous specific details are set forth in order to more fully illustrate the present invention. However, it is apparent to one of ordinary skill in the prior art having the benefit of this disclosure that the present invention can be practiced without these specific details. In other instances, well-known methods and procedures, components and processes have not been described in detail so as not to unnecessarily obscure aspects of the present invention. It is, of course, appreciated that in the development of any such actual implementation, numerous implementation-specific decisions must be made in order to achieve the developer's specific goals, such as compliance with application and business related constraints, and that these specific goals vary from one implementation to another and from one developer to another. Moreover, it is appreciated that such a development effort can be complex and time-consuming, but is nevertheless a routine undertaking of engineering for those of ordinary skill in the art having the benefit of this disclosure.

Figure 1:
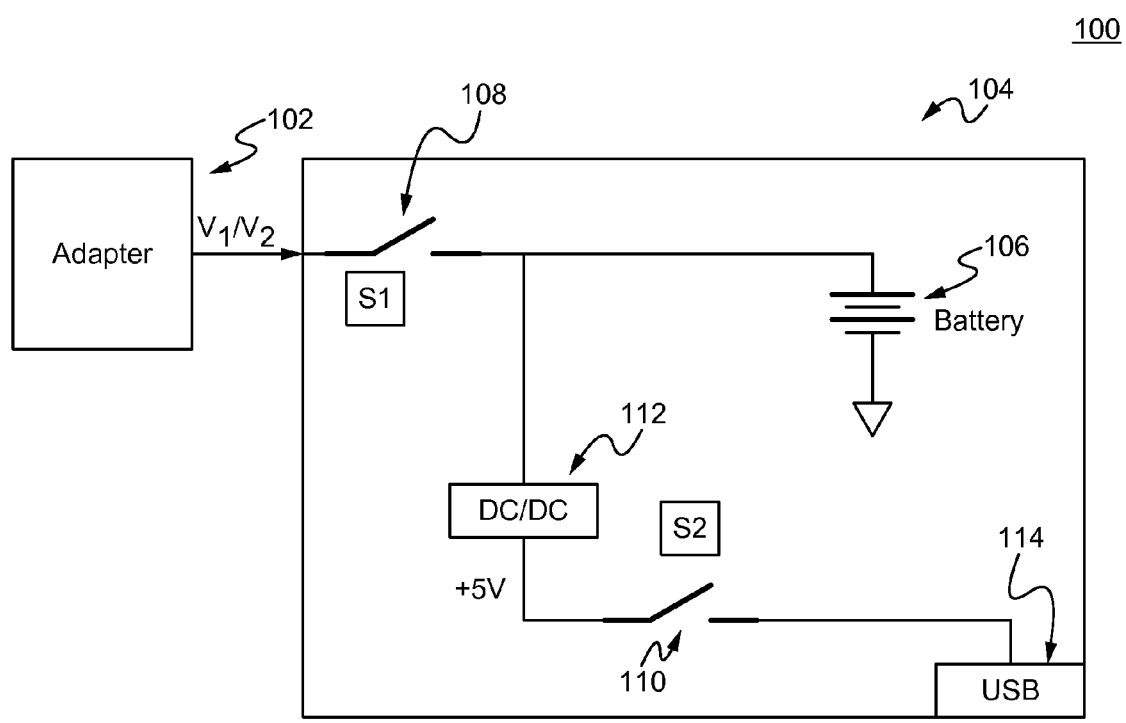
FIG. 1 illustrates a typical charging module.
Figure 2:
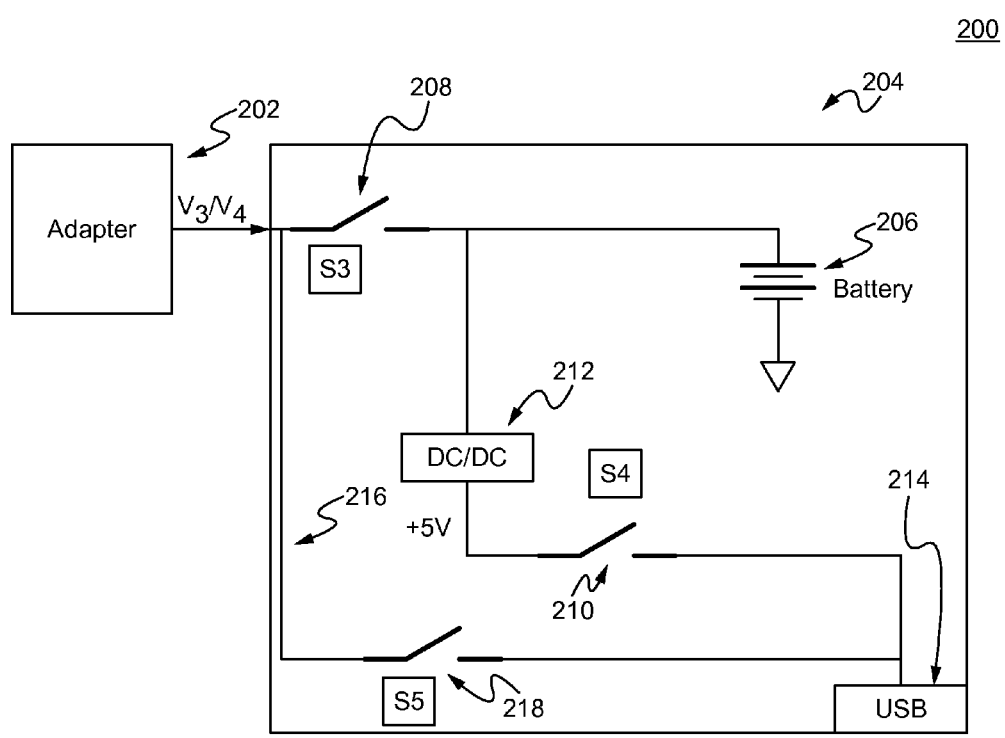
FIG. 2 illustrates a method and device for a charging module in accordance with some embodiments of the present invention.

FIG. 2 illustrates a method and device for a charging module 200 in accordance with some embodiments of the present invention. The charging module 200 can include an adaptor 202 coupled with a laptop 204. The adaptor 202 can output a voltage $V_3$ in a battery 206 charging mode. In the charging mode, the switch $S_3$ 208 is on "ON." In one example, a DC/DC converter 212 converts $V_3$ from a voltage in the range of 12V~20V to $V_4$ (such as 5V). $V_4$ can be used for one or more USB ports 214 through a switch S4 210. S4 210 can be controlled by a controller to protect USB ports at over current, short circuit and other abnormal conditions. When the laptop 204 goes into a deep sleep mode or power off conditions (S3 208 and/or S4 210 is/are OFF), the switch S5 218 of electric loop/circuit 216 in "ON." The adaptor 202 can provide a $V_4$ voltage (such as 5V) for powering/charging the one or more devices electrically coupled with the USB ports 214.

Figure 3:
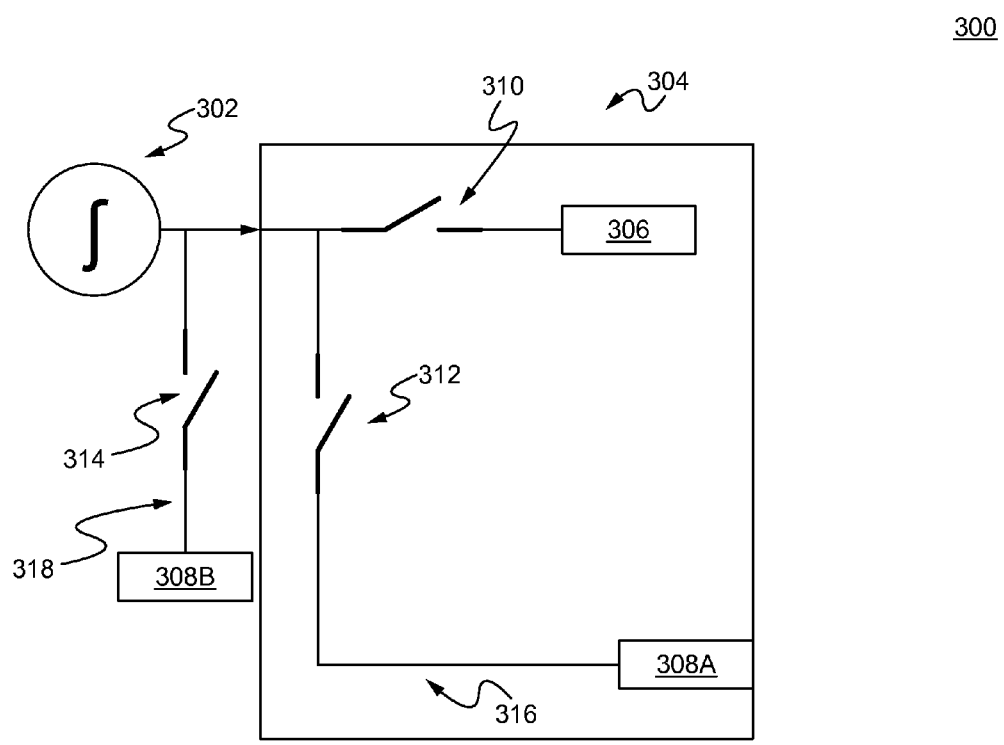
FIG. 3 illustrates a charging architecture in accordance with some embodiments of the present invention.

FIG. 3 illustrates a charging architecture 300 in accordance with some embodiments of the present invention. A power source 302 can couple with an electronic device 304. The electronic device 304, such as a laptop or a cell phone, comprises a component 306. The component 306 comprises a sleep mode for saving energy uses. The electrical coupling between the power source 302 and the component 306 can be controlled/regulated via the switch 310. Independent circuits 316 and 318 can be included as independent charging routes. The circuits 316 and 318 can be controlled by the switches 312 and 314 respectively, such that the power ports 308A and 308B can electrically coupled with the power source 302 with switches/controls 312 and 314.

Figure 4:
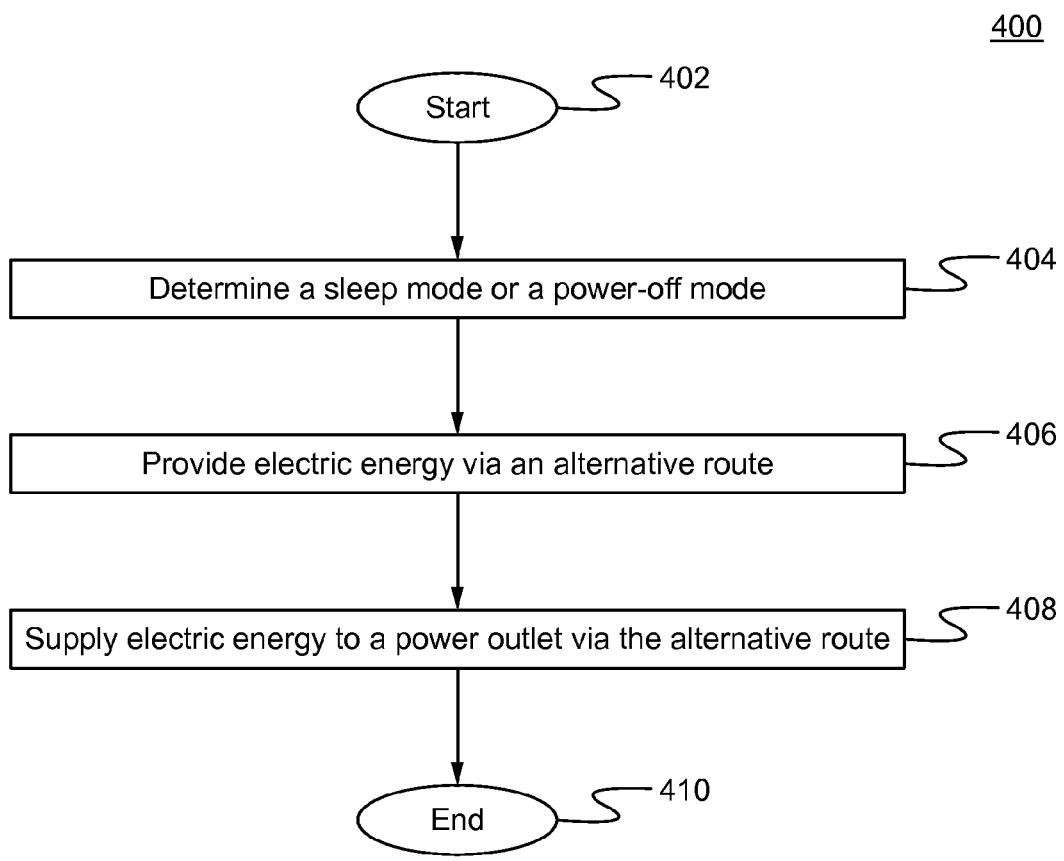
FIG. 4 illustrates a method of charging in a device sleeping mode in accordance with some embodiments of the present invention.

FIG. 4 illustrates a method 400 of charging in a device sleeping mode in accordance with some embodiments of the present invention. The method 400 can start at Step 402. At Step 404, a sleep mode or a power-off mode of a device is determined. The device can be a laptop, a cell phone, or any other electronic devices with a sleep mode mechanism. At Step 406, electric energy is provided via an alternative route if the device in a sleep mode. At Step 408, electric energy is supplied to a power outlet, such as a USB, via the alternative route. The method 400 can stop at Step 410.

The charging mechanism can be utilized for uninterruptedly providing an electric energy to a power port, such as USB ports, while the electric device is in a sleep mode.

In operation, when a sleep mode or a power-off mode is detected, a switch is turned on (close the loop) allowing the alternative electric pathway/circuit for continuously providing electric energy to the one or more USB ports.

The present invention has been described in terms of specific embodiments incorporating details to facilitate the understanding of principles of construction and operation of the invention. Such reference herein to specific embodiments and details thereof is not intended to limit the scope of the claims appended hereto. It is readily apparent to one skilled in the art that other various modifications can be made in the embodiment chosen for illustration without departing from the spirit and scope of the invention as defined by the claims.

What is claimed is:

1. A method of maintaining power supply comprising:
receiving a first electrical energy at an electric energy input port of an electronic device from a single output channel adapter that is coupled at the electric energy input port;
supplying the first electrical energy to an electric energy output port of the electronic device through a primary path coupling between the ports and to an internal battery through a secondary path coupling between the electric energy input port and the internal battery, wherein the primary path and the secondary path are both supplied with the first electrical energy at the same time;
sensing a sleep mode or a power-off mode of the electronic device; and
in response to the sensing, supplying a second electrical energy by the external single output channel adapter to the electric energy output of the electronic device through an alternative path coupling between the ports, wherein the first electrical energy and the second electrical energy received at the electric energy input port have different voltages and are transmitted through the primary path and the alternative path, respectively.

2. The method of claim 1, wherein the electric energy output port provides an informational signal.

3. The method of claim 1, wherein the electric energy output port comprises a USB port.

4. The method of claim 1, wherein the supplying the second electrical energy through the alternative path provides an uninterrupted power supply during the sleep mode.

5. The method of claim 1, further comprising sensing an open circuit between a power source and the electric energy output port.

6. An electronic device comprising:
an electronic energy input port configured to couple with a single output channel adapter;
an electronic energy output port configured to couple with an external personal device;
a first electrical pathway allowing transmission of a first electrical energy having a first voltage from the single output channel adapter received at the electronic energy input port to the electronic energy output port during a non-sleep mode of the electronic device;
a third electrical pathway allowing transmission of the first electrical energy from the single output channel adapter received at the electronic energy input port to an internal battery during the non-sleep mode of the electronic device, wherein the first electrical pathway and the third electrical pathway are both supplied with the first electrical energy at the same time; and
a second electrical pathway allowing transmission of a second electrical energy having a second voltage that is different from the first voltage from the single output channel adapter received at the electronic energy input port to the electronic energy output port during a sleep mode of the electronic device, wherein the second electrical energy received from the single output channel adapter is directly usable by the external personal device.

7. The device of claim 6, wherein the second electrical pathway comprises a conducting wire.

8. The device of claim 7, wherein the conducting wire is within a body of the electronic device.

9. The device of claim 7, wherein the conducting wire comprises a switch.

10. The device of claim 9, wherein the switch is in an open state when the electronic device is not in a sleep mode.

11. The device of claim 9, wherein the switch is in a close state when the electronic device is in a sleep mode.

12. An electronic device comprising:
- an electronic energy input port configured to couple with a single output channel adapter and to receive one of a plurality of different electrical energies having different voltages from the single output channel adapter based on one of a plurality of modes the electronic device is in; and
- an electronic energy output port configured to couple with an external personal device to receive the one of the plurality of different electrical energies via one of a plurality of electrical circuits that corresponds with the received electrical energy, wherein the plurality of electrical circuits includes:
  - a first electrical circuit coupling between the input and output ports, wherein the first electrical circuit is configured to be turned into a sleep mode in a predetermined condition; and
  - a second electrical circuit coupling between the input and output ports, wherein the second electrical circuit is configured to supply an electrical energy that is directly received at the electronic energy input port from the single output channel adapter to the electronic energy output port when the first electrical circuit is in the sleep mode.

13. The electronic device of claim 12, wherein the first electrical circuit comprises a first sub-electric circuit and a second sub-electric circuit.

14. The electronic device of claim 13, wherein the first sub-electric circuit couples with a battery.

15. The electronic device of claim 14, wherein the second sub-electric circuit couples with a USB port.

16. The electronic device of claim 14, wherein the second sub-electric circuit comprises a DC/DC converter, wherein the battery and the external personal device are charged concurrently when the first electrical circuit is not in the sleep mode.

17. The electronic device of claim 12, wherein the second electrical circuit comprises a switch.

18. The electronic device of claim 12, wherein the second electrical circuit is configured to have a voltage less than 7V.

19. The electronic device of claim 12, wherein the second electrical circuit is configured to have a voltage close to or equal to 5V.

20. The electronic device of claim 12, wherein the electronic device comprises a laptop, a server, a cell phone, or a combination thereof.

21. The electronic device of claim 12, wherein the predetermined condition comprises a non-use for a predetermined duration.

* * * * *